United States Patent
Tsai

(10) Patent No.: US 6,335,150 B1
(45) Date of Patent: Jan. 1, 2002

(54) MANUFACTURING METHOD FOR REFLECTING PANEL OF REFLECTIVE LIQUID CRYSTAL DISPLAY

(75) Inventor: Yung Huang Tsai, Taichung (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 09/729,221

(22) Filed: Dec. 5, 2000

(51) Int. Cl.7 .............................................. G02F 1/1335
(52) U.S. Cl. ........................ 430/321; 430/330; 349/113
(58) Field of Search .................................. 430/321, 325, 430/326, 330; 349/113

(56) References Cited

U.S. PATENT DOCUMENTS 5,204,765 A * 4/1993 Mitsui et al. .................. 359/70
6,097,458 A * 8/2000 Tsuda et al. .................. 349/113
6,163,353 A * 12/2000 Ting ............................. 239/113
6,181,397 B1 * 6/2001 Ichimura ...................... 349/113

FOREIGN PATENT DOCUMENTS

JP          2000-171794 A    *  6/2000

* cited by examiner

Primary Examiner—John A. McPherson
(74) Attorney, Agent, or Firm—Rosenberg, Klein & Lee

(57) ABSTRACT

A Manufacturing method for reflecting panel of reflective liquid crystal display. The developing/etching time for the photoresistor layer is such controlled as to achieve rough bottom faces under insufficient development and incomplete etching. Multiple polishedmicro-mirror face protuberances remain to achieve better optical properties. By means of the manufacturing method, the strength of the reflected light is controlled to produce uniform light and reduce glare.

6 Claims, 7 Drawing Sheets

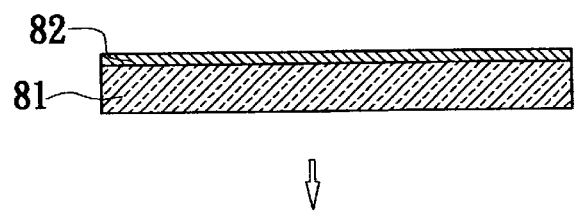
FIG. 5A
PRIOR ART
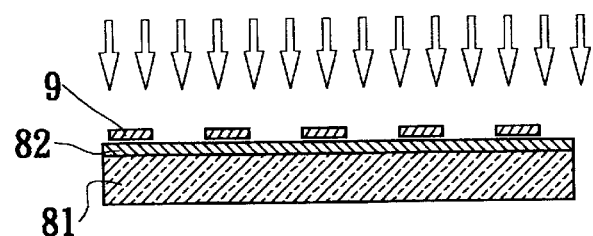
FIG. 5B
PRIOR ART
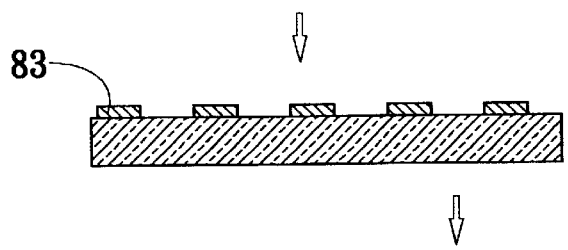
FIG. 5C
PRIOR ART
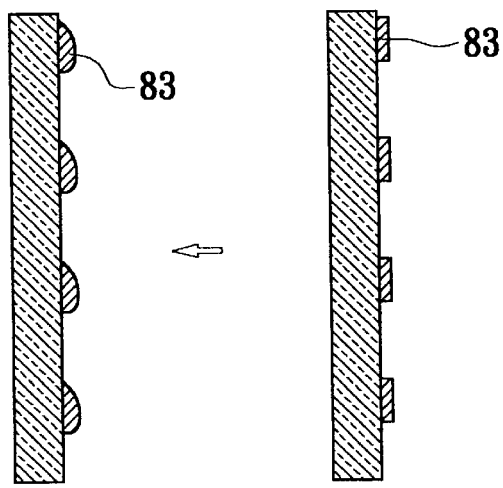
FIG. 5D
PRIOR ART
FIG. 5E
PRIOR ART
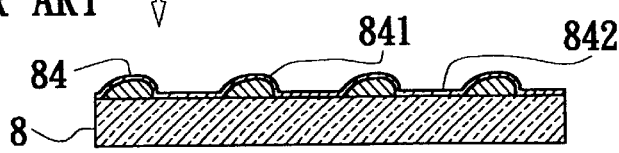
FIG. 5F
PRIOR ART

MANUFACTURING METHOD FOR REFLECTING PANEL OF REFLECTIVE LIQUID CRYSTAL DISPLAY

BACKGROUND OF THE INVENTION

The present invention is related to a manufacturing method for reflecting panel of reflective liquid crystal display, in which the exposure time or developing/etching time is controlled to achieve insufficient exposure or incomplete development for creating small etching depth.

FIGS. 5A to 7 show the manufacturing method for a reflecting panel of a conventional liquid crystal display. The reflecting panel 8 of the such liquid crystal display includes a substrate board 81 which is sprayed with photoresistor 82 and preheated. Then the reflecting panel 8 is covered by a photomask 9 and exposed. Then a developer is used to develop the exposed section or not exposed section so as to form multiple protuberance 83 on the photoresistor 82. Then the semiproduct of reflecting panel 8 is placed upright and heat-treated to soften the protuberances 83 and round the surface thereof. Finally, a metal film 84 is precipitated onto the reflecting panel 8 to naturally form multiple deformed sections 841 and multiple bottom faces 842. The deformed section 841 has an asymmetrical section. Light beam is reflected by the deformed section 841 at a predetermined angle.

The photoresistor 82 of the reflecting panel 8 of the liquid crystal display is etched by an etchant. However, the etching depth is very small. Therefore, in heat-treatment, it is hardly apparent to make the protuberances 83 flow downward due to gravity and it is difficult to achieve a desired deformation amount of the deformed section 841. In FIG. 5, the substrate board 81 is tilted to help in making the asymmetrical section. However, the shape of the deformed section 841 is hard to control. Moreover, the photoresistor is thoroughly etched downward to the substrate board 81. After the metal film 84 is precipitated, the bottom faces 842 are polished faces which totally reflect the light. As a result, the reflected light is very strong and glare. A human eye can hardly stare the panel for a long time and clearly see the picture shown by the display.

SUMMARY OF THE INVENTION

It is therefore a primary object of the present invention to provide a manufacturing method for reflecting panel of reflective liquid crystal display. The exposure time or developing/etching time for the photoresistor of the reflecting panel is controlled to achieve insufficient exposure or incomplete development/etching. The etched bottom faces have irregular roughness for scattering light beam and controlling strength of the reflected light as well as reduce glare. Therefore, the display can display clearer pictures.

The present invention can be best understood through the following description and accompanying drawings wherein:

BRIEF DESCRIPTION OF THE DRAWINGS

FIG. 5A shows a first step of the manufacturing procedure of a conventional reflecting panel of reflective liquid crystal display;

FIG. 5B shows a second step of the manufacturing procedure of a conventional reflecting panel of reflective liquid crystal display;

FIG. 5C shows a third step of the manufacturing procedure of a conventional reflecting panel of reflective liquid crystal display;

FIG. 5D shows a fourth step of the manufacturing procedure of a conventional reflecting panel of reflective liquid crystal display;

FIG. 5E shows a fifth step of the manufacturing procedure of a conventional reflecting panel of reflective liquid crystal display;

FIG. 5F shows a sixth step of the manufacturing procedure of a conventional reflecting panel of reflective liquid crystal display;

DETAILED DESCRIPTION OF THE PREFERRED EMBODIMENTS

Figure 1:
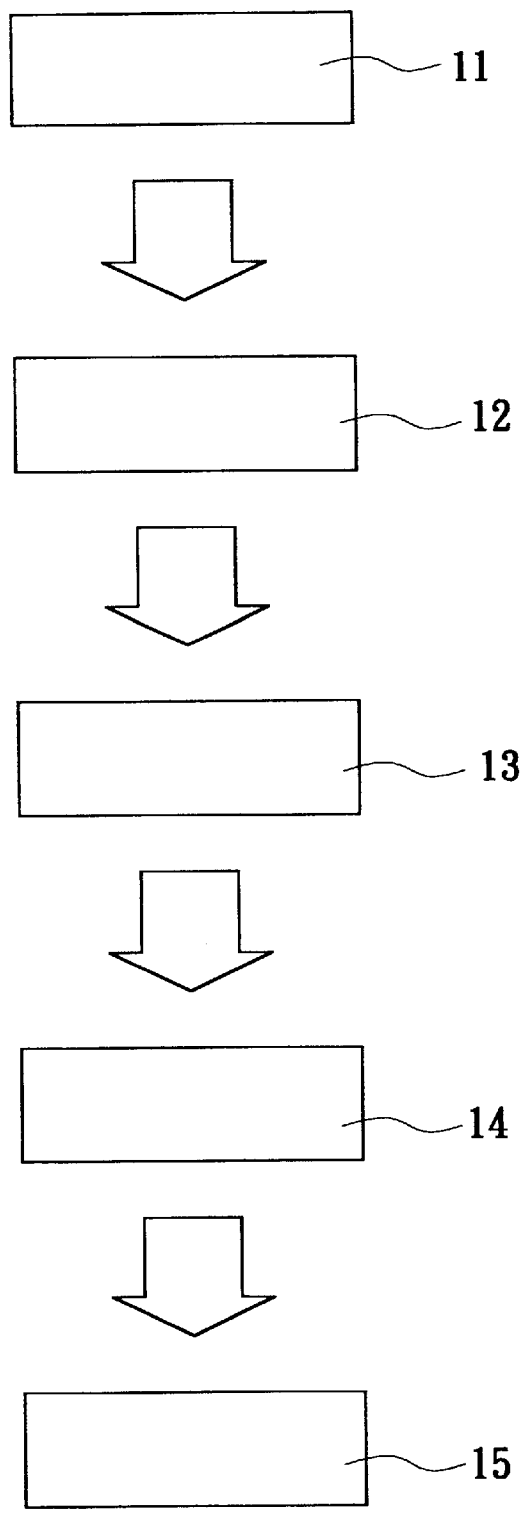
FIG. 1 is a flow chart of the present invention.
Figure 2A:
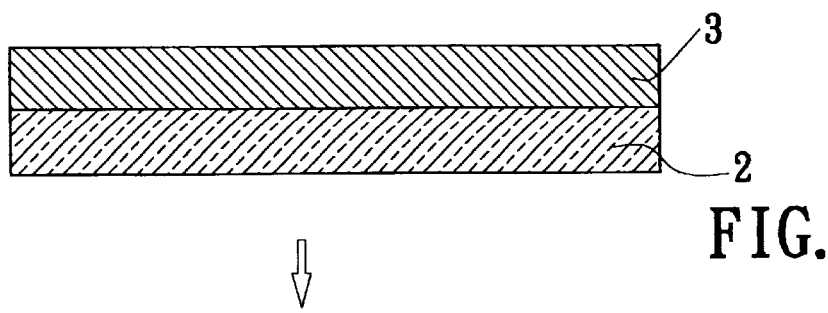
FIG. 2A shows a first step of the manufacturing procedure of the present invention.
Figure 2B:
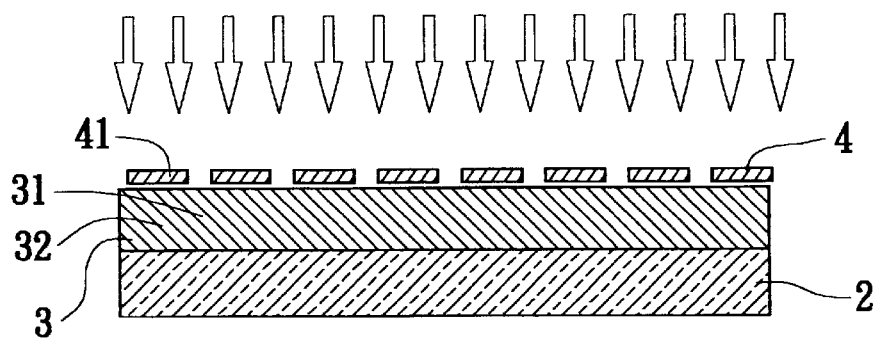
FIG. 2B shows a second step of the manufacturing procedure of the present invention.
Figure 2C:
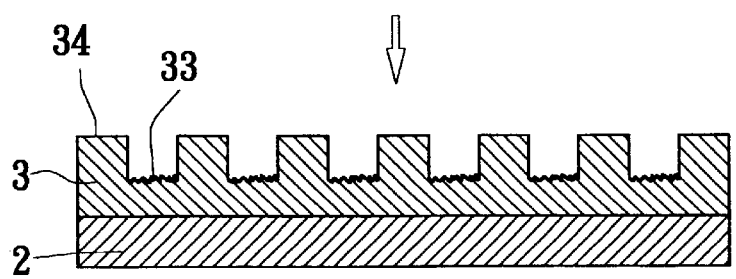
FIG. 2C shows a third step of the manufacturing procedure of the present invention.
Figure 2D:
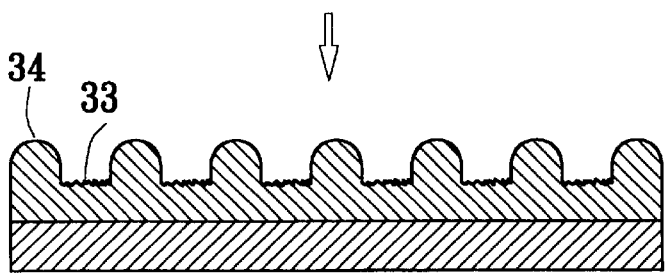
FIG. 2D shows a fourth step of the manufacturing procedure of the present invention.
Figure 2E:
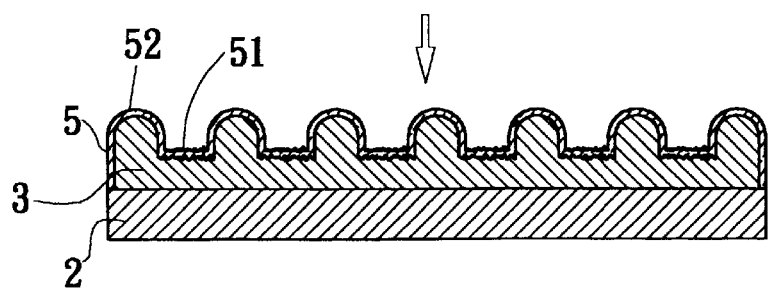
FIG. 2E shows a fifth step of the manufacturing procedure of the present invention.
Figure 3:
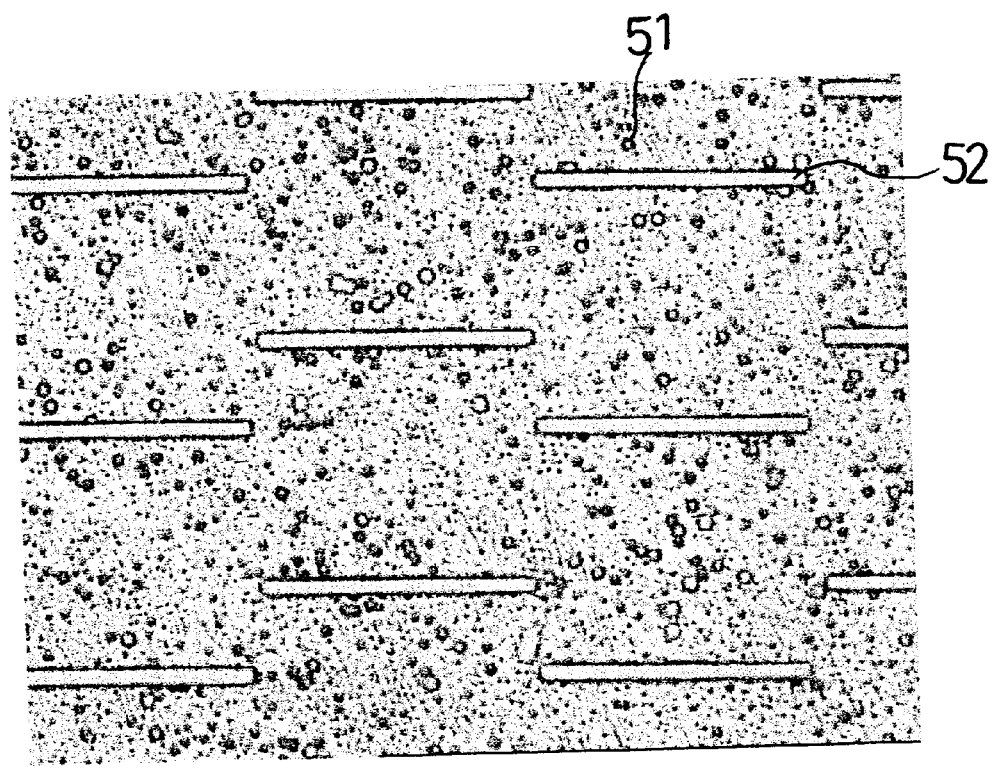
FIG. 3 is a top view of the present invention.
Figure 4:
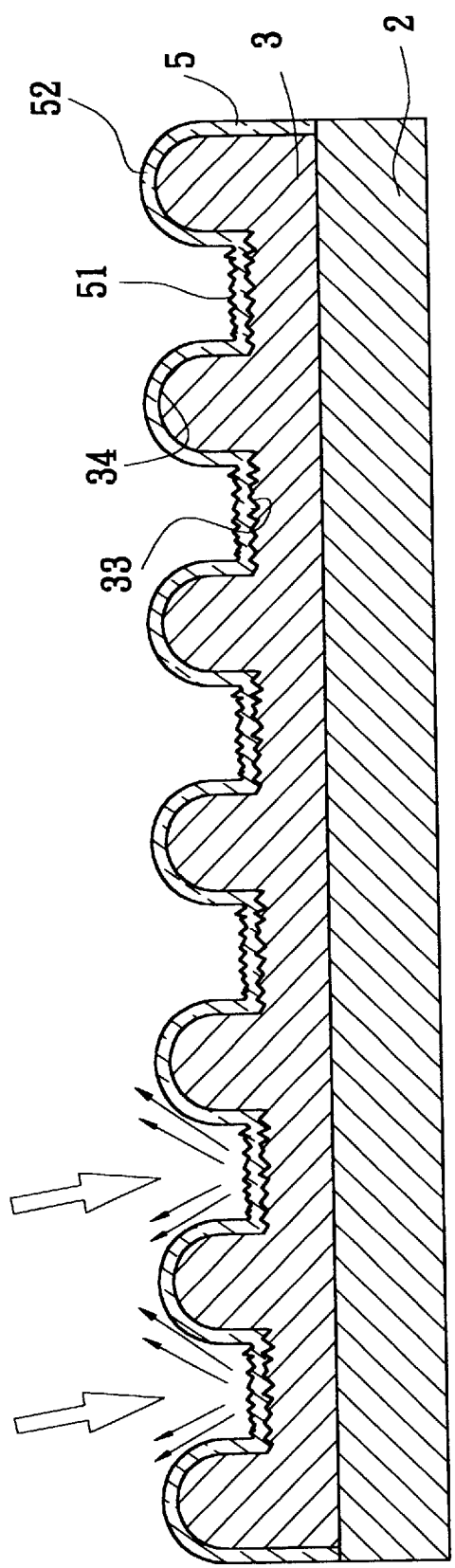
FIG. 4 shows that the reflecting panel of the present invention scatters light beam.
Figure 6:
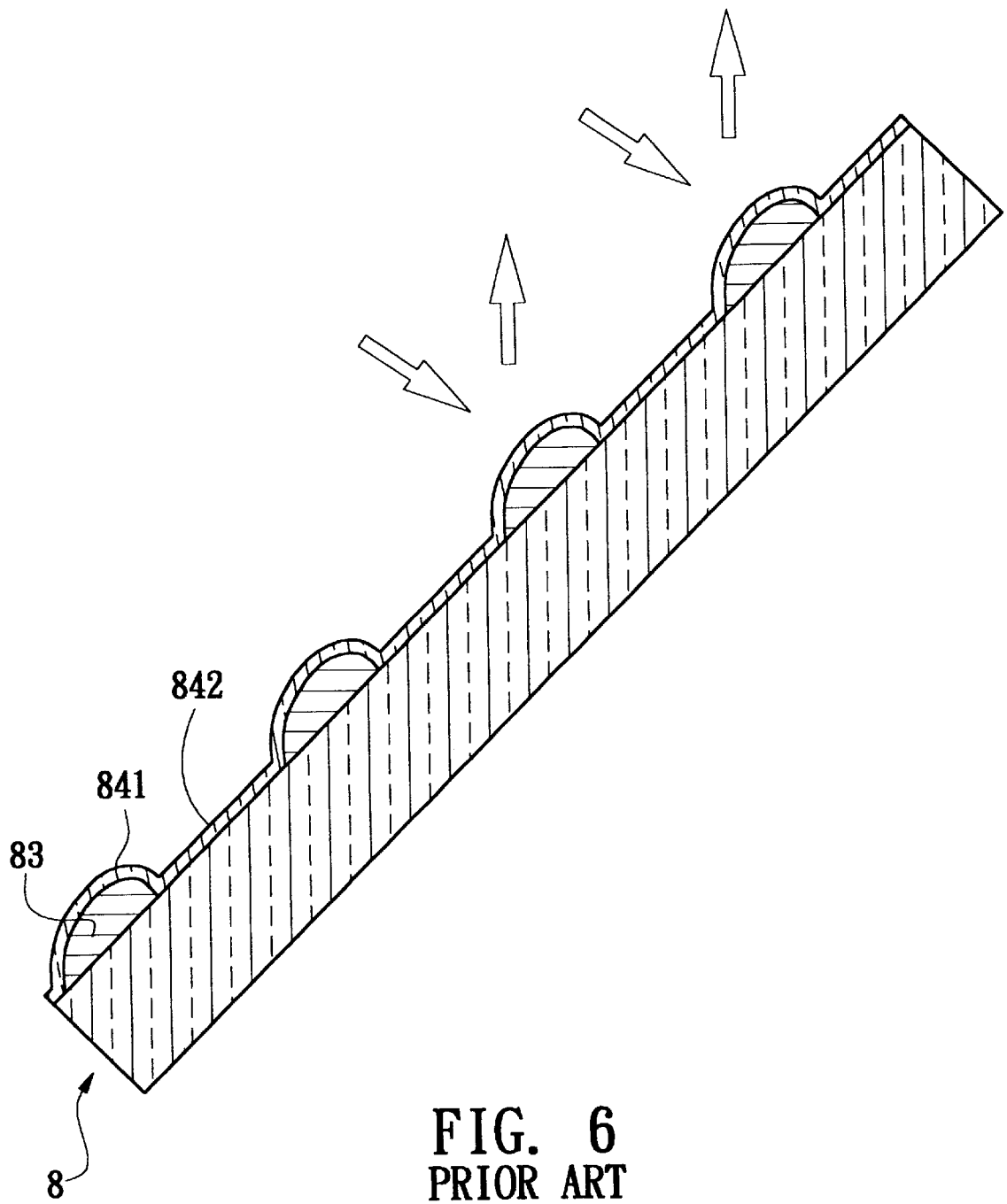
FIG. 6 is a side sectional view of the conventional reflecting panel of reflective liquid crystal display, showing that the light beam is reflected by the reflecting panel.
Figure 7:
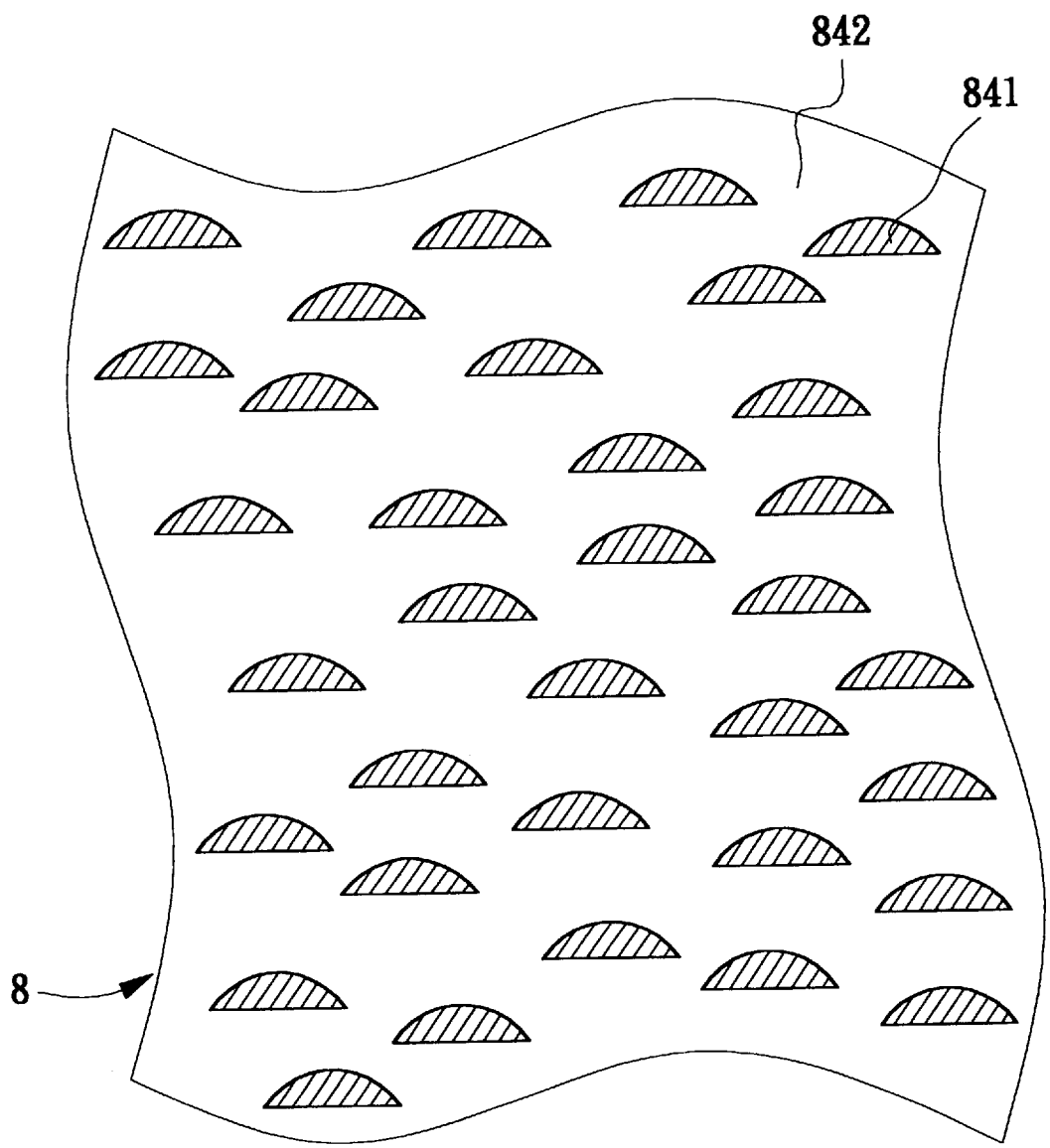
FIG. 7 is a top view of the conventional reflecting panel of reflective liquid crystal display.

Please refer to FIGS. 1 to 4. The present invention includes steps of:

First step 11 of spraying photoresistor: spraying a photoresistor layer 3 onto a top face of a rotated glass substrate material 2, the photoresistor layer 3 being positive or negative photoresistor, such as Clariant Azp 4620;

Second step 12 of exposure: preheating the glass substrate material 2 sprayed with the photoresistor layer 3 in first step 11 at 93° C. for 3 minutes, then the top face of the glass substrate material 2 being covered by a photomask 4 and exposed to UV light (12 mj) for about 25 seconds, the photomask 4 having multiple perforations 41 with predetermined shapes, whereby the photoresistor layer 3 is exposed to form multiple exposed sections 31 and multiple not exposed sections 32 with predetermined shapes;

Third step 13 of incomplete development/etching: immerging the semiproduct of reflecting panel exposed in second step 12 into an etchant (not shown) such as a developer, whereby the multiple exposed sections 31 or multiple not exposed sections 32 of the photoresistor layer 3 are incompletely developed/etched, with the multiple exposed sections 31 exemplified, the exposed sections 31 being etched by the etchant and thinned downward to form multiple rough etched bottom faces 33 without touching the substrate board 2, while the multiple not exposed sections 32 being not developed/etched by the developer, in the third step 13, the developing/etching time being controlled to be 80 seconds about one half to one third of the conventional time so as to achieve insufficient development and incomplete etching and provide a rough spreading etching effect, the roughness of the surface of the etched bottom faces 33 being within a range of 0.1 μm to 10 μm, the multiple not etched and not exposed sections 32 protruding beyond the etched bottom faces 33 and having a cross-sectional shape complementary to the shape of the photomask 4, the cross-section being circular, arched, strip-shaped or polygonal or having various shapes which are mixedly arranged, the dimension of length, width and height of the not exposed sections 32 being within a range of about 0.5 μm to 100 μm;

Fourth step 14 of heat-treatment: heat-treating the reflecting panel incompletely developed/etched in the third step 13, that is, heating the reflecting panel to 180° C. for 30 minutes so as to soften the top sections of the not exposed sections 32 into dome-like face, whereby each of the not exposed sections 32 is formed as a micro-mirror face protuberance 34; and Fifth step 15 of precipitating metal layer 5: precipitating a metal film 5 with very thin thickness (such as Al, Ag, Ni, Cr, etc.) onto the top face of the photoresistor layer 3 heat-treated in the fourth step 14 for reflecting light beam, the metal film 5 being one single laminate or multiple laminates, the metal film 5 having multiple spreading faces 51 on the etched bottom faces 33, the multiple spreading faces 51 having the same roughness as the etched bottom faces 33, the metal film 5 also having multiple micro-mirror faces 52 on the micro-mirror face protuberances 34.

In third step 13, the development is performed in shorter time so that the exposed sections 31 of the photoresistor layer 3 are etched to a shallower depth and thus the etched bottom faces 33 have shallower depth. When etched, the etched bottom faces 33 are naturally formed with fine roughness which leads to the same roughness of the spreading faces 51 of the metal film 5 precipitated thereon. The spreading faces 51 have multiple irregular protrusions with different sizes and angles so that the light beam will be reflected in different angles and scattered so as to uniform the light reflected by the micro-mirror faces 52. Therefore, the pictures displayed by the display will not have glare and the screen of the display will be clearer.

In second step 12, the photoresistor layer 3 can be also exposed in shorter time so as to have the exposed sections 31 with shallower depth. This can also achieve the incomplete development as in third step 13. In addition, in fourth step 14 of precipitating metal film, the etched bottom faces 33 of the reflecting panel can be naturally formed with spreading faces 51 for scattering light and controlling strength of the reflected light and reduce glare. Therefore, the screen of the display will be clearer.

The above embodiments are only used to illustrate the present invention, not intended to limit the scope thereof. Many modifications of the above embodiments can be made without departing from the spirit of the present invention.

What is claimed is:

1. A Manufacturing method for reflecting panel of reflective liquid crystal display, comprising steps of:

first step of spraying photoresistor: spraying a photoresistor layer onto a top face of a substrate material;

second step of exposure: preheating the glass substrate material sprayed with the photoresistor layer in first step, then the top face of the substrate material being covered by a photomask and exposed to UV light, the photomask having multiple perforations with predetermined shapes, whereby the photoresistor layer is exposed to form multiple exposed sections and multiple not exposed sections with predetermined shapes;

third step of incomplete development/etching: immersing the semiproduct of reflecting panel exposed in second step into an etchant, whereby the multiple exposed sections or multiple not exposed sections of the photoresistor layer are incompletely developed/etched, the exposed sections or not exposed sections being etched by the etchant and thinned downward to form multiple rough etched bottom faces without touching the substrate material, while the multiple not exposed sections or exposed sections being not developed/etched by the etchant, in the third step, the developing/etching time being such controlled as to achieve insufficient development and incomplete etching and provide a rough spreading etching effect;

fourth step of heat-treatment: heat-treating the reflecting panel incompletely developed/etched in the third step so as to soften the top sections of the not exposed sections into dome-like face, whereby each of the not exposed sections is formed as a micro-mirror face protuberance; and fifth step of precipitating metal layer: precipitating a metal film with very thin thickness onto the top face of the photoresistor layer heat-treated in the fourth step for reflecting light beam, the metal film having multiple spreading faces on the etched bottom faces, the multiple spreading faces having the same roughness as the etched bottom faces, the metal film also having multiple micro-mirror faces on the micro-mirror face protuberances.

2. A Manufacturing method for reflecting panel of reflective liquid crystal display as claimed in claim 1, wherein the rough spreading etched bottom faces are positioned under the multiple polished micro-mirror face protuberances which protrude beyond the etched faces.

3. A Manufacturing method for reflecting panel of reflective liquid crystal display as claimed in claim 1, wherein the substrate material in first step is glass-made and the photoresistor can be positive or negative photoresistor.

4. A Manufacturing method for reflecting panel of reflective liquid crystal display as claimed in claim 1, wherein the roughness of the surface of the etched bottom faces is within a range of 0.1 μm to 10 μm, the multiple not etched and not exposed sections protruding beyond the etched bottom faces and having a cross-sectional shape complementary to the shape of the photomask, the dimension of length, width and height of the not exposed sections being within a range of about 0.5 μm to 100 μm.

5. A Manufacturing method for reflecting panel of reflective liquid crystal display as claimed in claim 1, wherein in the second step, the photoresistor layer being preheated at 93° C. for 3 minutes.

6. A Manufacturing method for reflecting panel of reflective liquid crystal display as claimed in claim 1, wherein in the fourth step, the reflecting panel is heated to 180° C. for 30 minutes.

* * * * *